US011269860B2

(12) United States Patent
Kussmaul et al.

(10) Patent No.: US 11,269,860 B2
(45) Date of Patent: Mar. 8, 2022

(54) IMPORTING EXTERNAL CONTENT INTO A CONTENT MANAGEMENT SYSTEM

(71) Applicant: INTERNATIONAL BUSINESS MACHINES CORPORATION, Armonk, NY (US)

(72) Inventors: Timo Kussmaul, Boeblingen (DE); Andreas Stay, Boeblingen (DE); Dieter Buehler, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 16/430,493

(22) Filed: Jun. 4, 2019

(65) Prior Publication Data

US 2020/0034355 A1 Jan. 30, 2020

(30) Foreign Application Priority Data

Jul. 30, 2018 (GB) ...................................... 1812377

(51) Int. Cl.
*G06F 16/30* (2019.01)
*G06F 16/23* (2019.01)
*G06F 16/25* (2019.01)

(52) U.S. Cl.
CPC .......... *G06F 16/2379* (2019.01); *G06F 16/25* (2019.01)

(58) Field of Classification Search
CPC .............................. G06F 16/2379; G06F 16/25
USPC ........ 707/609, 687, 705, 769, 790, 813, 821
See application file for complete search history.

(56) References Cited

U.S. PATENT DOCUMENTS

| 7,548,565 | B2 * | 6/2009 | Sull | G06T 3/4092 370/503 |
| 9,286,274 | B2 * | 3/2016 | Rice | G06F 3/0486 |
| 9,606,970 | B2 * | 3/2017 | Pappas | G06F 16/86 |
| 10,529,446 | B2 * | 1/2020 | Boland | G16H 10/60 |
| 2003/0177503 | A1 * | 9/2003 | Sull | G06F 16/71 725/112 |

(Continued)

FOREIGN PATENT DOCUMENTS

WO 2012112390 A1 8/2012

OTHER PUBLICATIONS

IBM, "Method for Data Import Insuring Data Integrity", IP.com No. IPCOM000124406D, Original Publication Date: Apr. 19, 2005, IP.com Electronic Publication Date: Apr. 19, 2005, 5 pages.

(Continued)

*Primary Examiner* — Sana A Al-Hashemi
(74) *Attorney, Agent, or Firm* — Steven M. Bouknight (57) ABSTRACT

A computer-implemented method for importing external data into a content management system (CMS) may be provided. The CMS comprises a search and an authoring service. The CMS also comprises a dynamic page connector service enabling an import of external data into the content management system. The method comprises receiving address data relating to the external data, reading the external data using the address data received, selecting a page template from a plurality of predefined page templates, creating at least one new content item in the content management system comprising at least a data element of the read external data based on the selected predefined page template, and integrating in the at least one new content item data concerning a hierarchy structure between the at least one created content item and other content items.

14 Claims, 5 Drawing Sheets

(56) References Cited

U.S. PATENT DOCUMENTS

2013/0132429 A1   5/2013 Petri
2016/0098399 A1   4/2016 Casperson

OTHER PUBLICATIONS

The NEOS Team, "NEOS CMS Documentation", Release 3.0.0, Jul. 4, 2018, 369 pages.
Pending GB Application No. GB 1812377.8, Filed on Jul. 30, 2018, entitled: "Importing External Content Into a Content Management System", 32 pages.

* cited by examiner

IMPORTING EXTERNAL CONTENT INTO A CONTENT MANAGEMENT SYSTEM

BACKGROUND

The invention relates generally to a content management system, and more specifically, to a computer-implemented method for importing external data into a content management system. The invention relates further to a related content management system for importing external data into the content management system, and a computer program product.

Information management has become a category of its own in large enterprises. In the information age, creating and managing content of any kind becomes a predominant requirement in modern enterprises. The digitization of all aspects of business activities—e.g., Internet-only shops, Internet-of-Things processes, the management of the digital experience of customers—requires a permanent creation, update, potential retirement and adaptation of existing content as well as the integration of new—potentially enterprise-external—content. This relates generally to existing as well as to new products and services. Modern enterprise-class content management systems (CMS) are often based on separate content authoring and content delivery systems. Thereby, different requirements of content creation and retrieval tasks (e.g., the used data model, availability and caching) have to be met. The process responsibility for creating, modifying and editing content takes typically place in the authoring system and is referred to as authoring. The process responsible for transferring content from the authoring system to the delivery system is typically referred to as publishing. The content is either transferred as-is (e.g., text, video, sound, images, static files) or transformed (e.g., pre-rendered templates) to better suit delivery use-cases.

SUMMARY

According to one aspect of the present invention, a computer-implemented method for importing external data into a content management system may be provided. The content management system may comprise a search service and an authoring service. The content management system may also comprise a dynamic page connector service (DPCS) enabling an import of external data into the content management system. The method may comprise receiving address data relating to the external data, reading the external data using the address data received, and selecting a page template from a plurality of predefined page templates.

Furthermore, the method may comprise creating at least one new content item in the content management system comprising at least a data element of the read external data based on the selected predefined page template, and integrating in the at least one new content item data concerning a hierarchy structure between the at least one created content item and other content items, in particular from the external data and the existing data.

According to another aspect of the present invention, a content management system for importing external data into the content management system may be provided. The content management system may comprise a search system and an authoring system. The content management system may also comprise a dynamic page connector system (DPCS) adapted for an import of external data into the content management system. The dynamic page connector system may comprise a receiving unit adapted for receiving an address for accessing the external data stored on an external data source, a reading unit adapted for reading the external data using the address, and a creation module adapted for creating at least one new content item in the content management system comprising at least a data element of the read external data based on the selected predefined page template.

Moreover, the content management system may comprise an integration unit adapted for integrating, in the at least one new content item, data concerning a hierarchy structure between the at least one created content item and other content items, and the content management system may also comprise a selecting unit adapted for selecting a page template from a plurality of predefined page templates stored in a template storage.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Preferred embodiments of the invention will be described, by way of example only, and with reference to the following drawings.

DETAILED DESCRIPTION

In the context of this description, the following conventions, terms and/or expressions may be used:

The term 'external data' may denote structured or unstructured data representing a sort of content item being managed or only stored by an external system which may not be part of the content management system. Thus, any other—e.g., third-party system—may be suitable for representing a source of the external data.

The term 'content management system' (CMS) may denote an application or system for managing the creation and modification of digital content. It may typically support multiple users in a collaborative environment. CMS features vary widely from system to system. Most CMSs include, e.g., Web-based publishing, format management, history editing and version control, indexing, search, and retrieval. By their nature, content management systems may support the separation of content and presentation of the content. A web content management system (WCM or WCMS) may be a CMS designed to support the management of the content of Web pages. Most popular CMSs are also WCMSs. Web content includes text and embedded graphics, photos, videos, audio, maps, and program code (e.g., for applications) that displays content or interacts with the user.

Such a content management system typically has two major components: (a) a content management application (CMA) as the front-end user interface that allows a user, even with limited expertise, to add, modify, and remove content from a website without the intervention of a webmaster; and (b) a content delivery application (CDA) which compiles that information and updates a website.

The term 'search service' may denote program based service, e.g., in the form of a web search engine, which is a software system that is designed to search for information on the World Wide Web or local data collections and/or repositories. The search results may generally be presented as lines of results often referred to as search engine results pages. The information may be a mix of web pages, images, and other types of files. Some search engines also mine data available in databases or open directories. Unlike web directories, which are maintained only by human editors, search engines also maintain real-time information by running an algorithm on a web crawler. Internet content that is not capable of being searched by a web search engine may generally be described as the deep web.

The term 'authoring service' may denote a software service supporting a creation and management of content items. It may also allow defining and managing hierarchies, as well as an approval process.

The term 'dynamic page connector service' (DPCS) may denote the newly proposed concept of the here described patent application. It may be instrumental for connecting an existing content management system to data stored in an external data source. Firstly, it may be enabled to receive address data for the external data source. A user may, e.g., type in an input field of an I/O (input/output) device address data for the external data. The DPCS may then read the external data and potentially transform them in a better suitable format for the content management system. Other tasks may comprise an automatic creation of a new content item, and an integration into the existing content, and managed by the content management system.

The term 'page template' may denote a sample for either the form art and/or sample content for a newly created content item. This way, the content creation process may be eased, either for the human author or for the automatic creation of a new content item.

The term 'hierarchy structure' may denote a dependency structure between content items in the content management system and/or content items from other sources. Sub-ordinate content items may be linked to a superordinate hierarchy level. Alternatively, and or in combination with a strict hierarchy, also network dependencies or network hierarchies may be used instead of simple one-dimensional hierarchies. The hierarchies may be described e.g., by a hierarchically organized link list, or a markup language, e.g., SGML open parent standard generalized markup language), (HTML (hypertext markup language), by a designated field of a content item containing references or identifiers of other content items which are hierarchically superordinate or subordinate, or others.

The term 'external content item' may denote a data element originally stored in an external—in particular external to the content management system—data source. These external data elements may be managed by, e.g., another content management system, or any other type of application.

Because content is created by different authors and for different purposes, a plurality of sources for the content creation process may exist in enterprises. Furthermore, it may be the case that more than one content management system may be used in one single company. Furthermore, content may also be made available for specific purposes only, e.g., web-shops, a library of service manuals, user information, how-to descriptions, business plans, just to name a few. This makes it difficult for chief digital officers (CDO) to get an overview about all content available in an enterprise, and to manage it consistently. Additionally, it may be useful to integrate content cross enterprise boundaries; it may, e.g., be useful to integrate product, marketing and/or service data from a content management system of a product supplier in order to sell the products under one's own name. In such a case, it may be a waste of resources to "reinvent" the content of the products related information of the supplier again and again. The proposed computer-implemented method for importing external data into the content management system may offer multiple advantages and technical effects:

An integration of content managed under the control of any other content management system into a dedicated content management system may be enabled automatically. At the same time, hierarchy information of the other CMS may also be reflected when integrating content items into the dedicated CMS. This may reduce at least three kinds of activities when integrating content which is already available in another system dealing with content items: content creation, content integration and managing hierarchies and dependencies between content items in the CMS "consuming" the newly available content.

It may also enable an automatic synchronization of content items in different content management systems. This may be achieved by a messaging service between the two content management systems, e.g., for content items that are no longer valid in the leading CMS. The proposed concept may also build a basis for an automatic integration of new content, having been created as part of the external data source. Assumed, hierarchy structures and dependencies within the actual CMS have changed over time, the integration process would automatically reflect the new hierarchies and integrate the new content items reflecting the new hierarchies and the CMS. This may also include a reflection of new or changed hierarchies in the external data source.

It may also enable that a user used to one specific CMS may continue to use the look and feel and layouts of page views and rendering services of "his" CMS. On the other side, content items may be managed that are external to "his" CMS. The core data responsibility for the external content may, thereby, continue to remain under the control of the external content manager.

The proposed concept may also enable to integrate product data from an external product catalog service into the CMS. A user of the CMS or a CMS client application is then enabled to view and use the product data using the known, unchanged look and feel of the CMS or the CMS client application. As another advantage, the CMS and the CMS client application may be enabled to render and process the product data without requiring any functional extension or modification.

In the following, further embodiments—also applicable to the content management system—will be described:

According to one advantageous embodiment of the method, the receiving, the reading, the creating, and the integrating may be performed by the dynamic page connector service. This way, nearly all activities with the new concept may be performed by the same component. The step of selecting may be performed by a related template page service (TPS). This may typically be triggered by the DPCS. Such a service may be used also for activities in the authoring system. However, also an implementation in which the DCPS is responsible for also performing the selection step may be possible.

According to one preferred embodiment of the method, the other content items may already be existing content items in the content management system and/or newly created content items. Thus, there are no limits or other restrictions for the new content items required.

According to permissive embodiments of the method, sources for the external data may comprise at least one selected out of the group comprising a shopping system, another content management system, a collection of content files in a file system and or a database, an electronic library system, and a data corpus of an artificial intelligence system, a micro-service, a cloud service, an enterprise application server, an enterprise application, a marketing system, a supply management system, a logistics system, a tax system. Hence, the source for the here proposed concept may originate from a large plurality of different applications. The list mentioned may be extended by other suitable applications, e.g., a product catalog.

According to one possible embodiment of the method, the search service may be linked to a search index comprising content items and/or addresses of internal and/or external content items. This may be a useful implementation option in which not only internal content may be referenced but also content items being stored in other external systems.

According to one preferred embodiment of the method, the selection of the page template from the plurality of predefined page templates may be performed based on a keyword of a received data record from the external data. Thus, the keyword may be extracted from the received data record. For this, it may be useful to be able to interpret the structure of the received record and use one or more keywords for the selection of the suitable page template. E.g., in an Internet shop the item "car rim" may trigger a specific page template. In another case, it may, e.g., be appropriate to have a page template comprising a table. In order for a proper selection of a page template, a linguistic analysis of the received record and/or other interpretation services may be applied.

According to one useful embodiment of the method, the creation of the at least one content item may also comprise copying information of the template page—which may be returned by the TPS—into the at least one new content item, and overwriting a data field or multiple data fields in the page template using data read from the external data. Thereby, the data field may comprise at least one selected out of the group a page title, a description, a SEO (search engine optimization) URL (universal resource locator) data, a page content, a keyword, a tag, a markup fragment, code fragment, a free—in particular, arbitrary—content field, an address of a further external service, or other suitable data fields.

Additionally, the creation step of the at least one content item may also comprise setting parent page association data of the newly created at least one content item using data from a read external data record, and adding data required for reading a full data record from the external service. One of the options for this may be adding a URL for retrieving data via the external service API (application programming interface). Consequently, the creation process of the content item may also be supported by an artificial or cognitive system and related services.

According to one extended embodiment, the method may also comprise comparing the at least one created content item—in particular, in the content management system—with data of the external data—in particular, from the source of the external data—after a predefined time period. This may enable a re-synchronization between the external data and the content items managed within the content management system.

This feature of the proposed concept may also comprise a deletion of a content item, which was newly created if it is no longer available in the system comprising the external data. This way, a regular—or at times of specific events—resynchronization of the data and the content management system and the external data may be achieved.

Consequently, and according to one optional embodiment, the method may also comprise receiving an invalidation event message by the content management system—eventually be generated by the external data source—regarding the external data, and deleting at least one created content item in the content management system. It may easily be imagined that also this active technique enables a re-synchronization between the external data and the content items managed within the content management system.

According to another optional embodiment, the method may also comprise receiving a new content trigger message by the content management system—e.g., being generated by a system related to the source of the external data—indicating new data—in particular, new data as part of the external data—and reading only those external data conforming to filter data relating to the new content trigger message. Thus, only newly available external data may be synchronized with the content management system, reducing the required compute capacity and bandwidth. This may, e.g., be implemented by reading only those data having a timestamp after the last read process, or reading only those external data relating to a specific topic, i.e., only a part of the electronic shop system or other content managing applications.

In the following, a detailed description of the figures will be given. All instructions in the figures are schematic. Firstly, a block diagram of an embodiment of the inventive computer-implemented method for importing external data into a content management system is given. Afterwards, further embodiments, as well as embodiments of the content management system for importing external data into the content management system, will be described.

Figure 1:
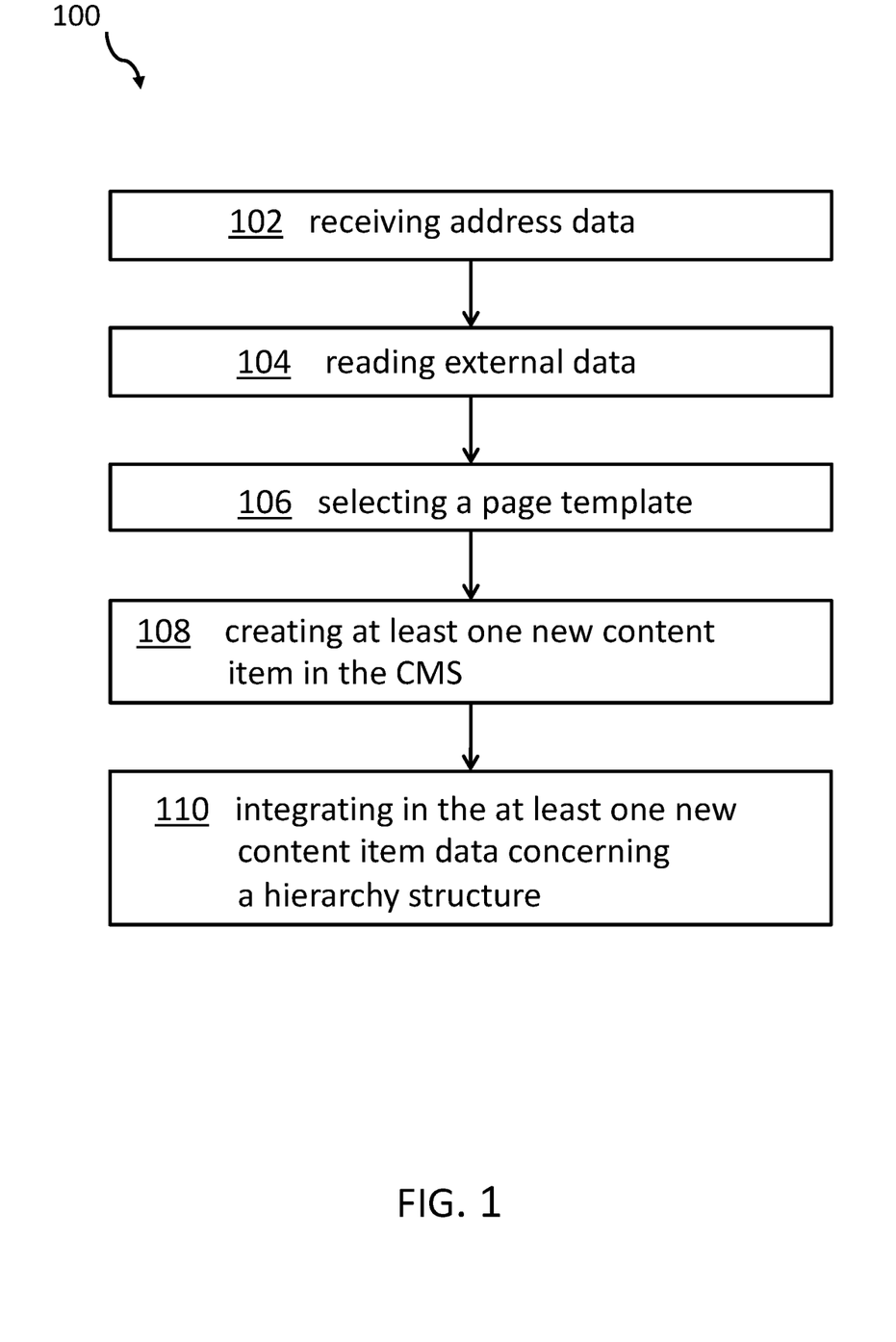
FIG. 1 shows a block diagram of an embodiment of the inventive computer-implemented method for importing external data into a content management system.

FIG. 1 shows a block diagram of an embodiment of the computer-implemented method 100 for importing external data into a content management system. The content management system comprises a search service and an authoring service. The content management system also comprises a dynamic page connector service (DPCS) enabling an import of external data into the content management system. The method 100 comprises receiving, 102, address data relating to the external data, reading, 104, the external data using the address data received, and selecting, 106, a page template from a plurality of predefined page templates.

Additionally, the method 100 comprises creating, 108, at least one new content item in the content management system comprising at least a data element of the read external data based on the selected predefined page template, and integrating, 110, in the at least one new content item data concerning a hierarchy structure between the at least one created content item and other content items. The hierarchy can reflect those of the external data as well as content items of the already managed content items in the content management system. As already mentioned, the hierarchy may be expressed in a markup language and or index or directory/repository services.

Figure 2:
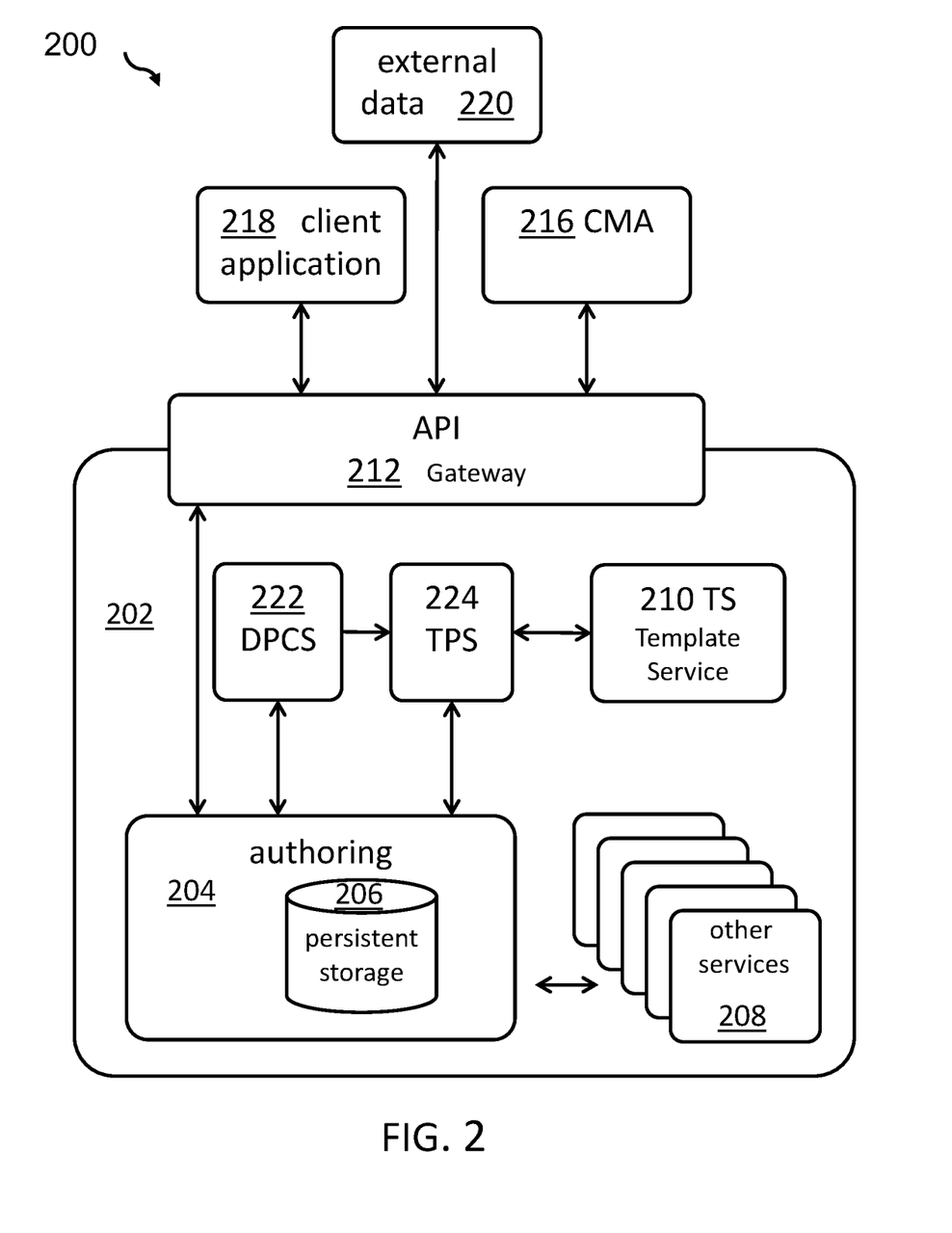
FIG. 2 shows a block diagram of the modified content management system.

FIG. 2 shows a block diagram 200 of the modified content management system 202. One core component of the CMS 202 is the authoring functionality 204, including the persistent storage 206 for storing content items, metadata, hierarchy data, and any other required data for the management of the CMS 202. Under the other services 208 may fall, e.g., search services, index services, archiving services, user management services and so on. The proposed CMS 202 also comprises a template service TS 210 accessing templates and a gateway 212 which may be implemented as an application programming interface (API) for a communication with the content management application (CMA) 216, or any other client application 218 with permitted access to the CMS 202.

External content may exist in other systems, i.e., external data 220. These external data 220 may exist in different forms and may be managed under different control systems, e.g., a web-shop, a product catalog, a data corpus of an artificial intelligence system, a document library, a repository, a service manual, a Wiki structure and many more.

New components—typically not part of traditional CMSs—of the CMS 202 are the dynamic page connector service (DPCS) 222 component and the template page service (TPS) 224 component. These components are responsible for the process steps discussed in the context of FIG. 1. The arrows between the different components show main content and main control flow information inside and outside the CMS 202.

Figure 3:
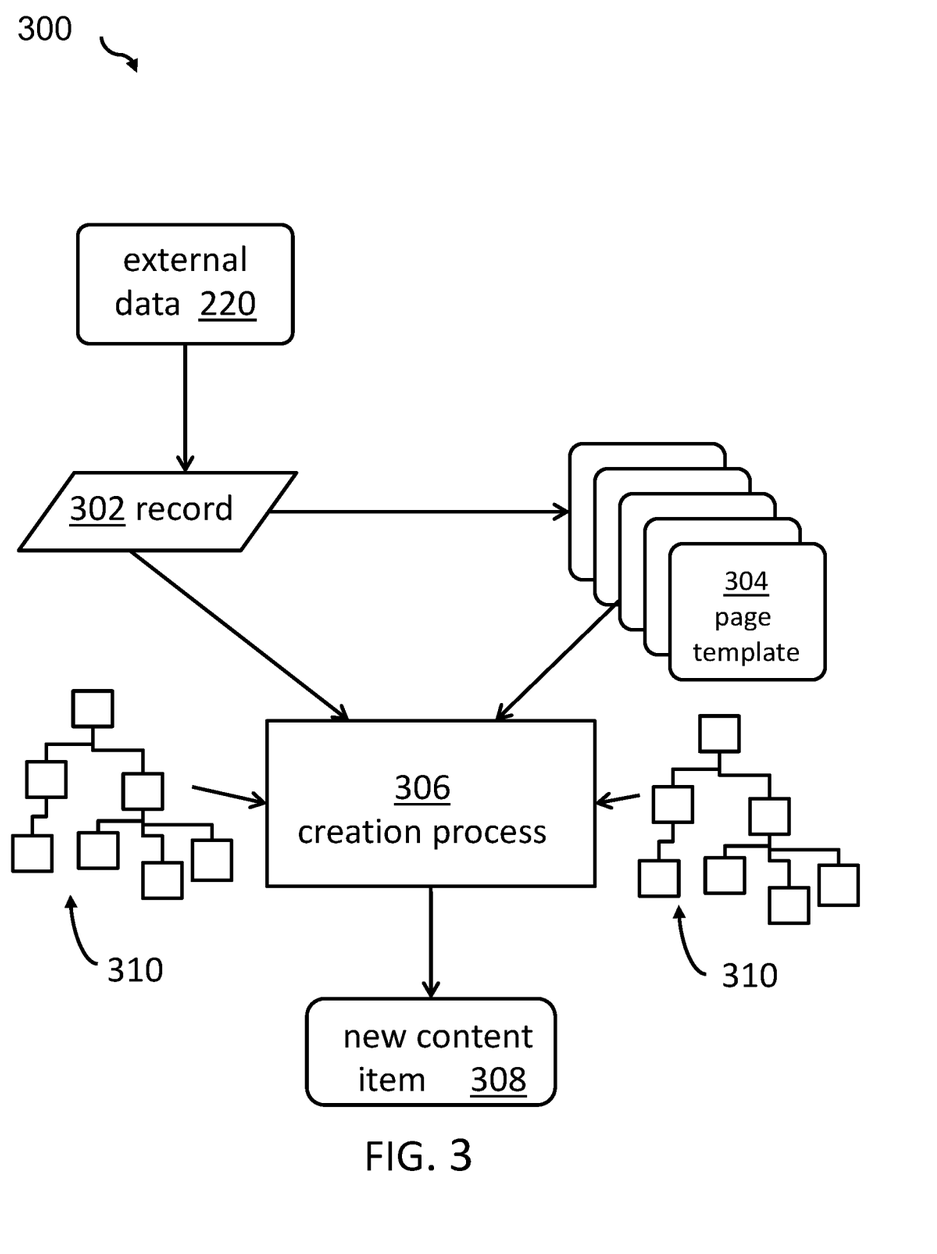
FIG. 3 shows an example of how a new content item is created using different information sources.

FIG. 3 shows an example 300 of how a new content item is created using different information sources. The external content/external data 220 exist in, e.g., an external system as discussed in various places of this document. The data 220 may be retrieved using a data connection between the CMS (compare CMS 202, FIG. 2) and the external data source. APIs or external services may be used to establish the communication connection. The external data 220 may come in the form of content or data records 302. Based on the content and/or the kind of record 302 delivered by the external data 220 source, a page template 304 is selected. The selection may be based on keyword comparisons (between a field in the record 302 and a data field of the various page templates 304). Additionally, cross keyword translation tables or semantic comparisons may be used for one or more keywords of the received content record 302, in order to select one of the plurality of page templates 304. This task may be performed by the template page service (compare 224, FIG. 2).

The record 304 as well as the selected page template 304 are made available to the creation process 306, namely the dynamic page connector service (FIG. 2, 222). The content item 302 is created by the creation process 306 using additional information about existing hierarchies 310 in the content organization in the external data and the relationship of the content data of the received content record 302 in the context of the newly created content item 308. Additionally, the creation process 306 takes care of embedding the newly created content item 308 into the existing data hierarchy 310 of the present CMS.

Hence, if a new subject-matter comprising a plurality of external data items unknown to the current CMS, to which the newly content items should be integrated, the content item hierarchy in the actual CMS will most probably look similar (identical) to the content item hierarchy in the external data source. Additionally, the newly created content items will also have links to existing content items of the actual CMS.

It may also happen that newly created content items may be identical to existing content items in the CMS. In such a case, only the hierarchy information may be used within the CMS and additional links to other newly created content items, and/or also to already existing content items of the CMS are created.

Figure 4:
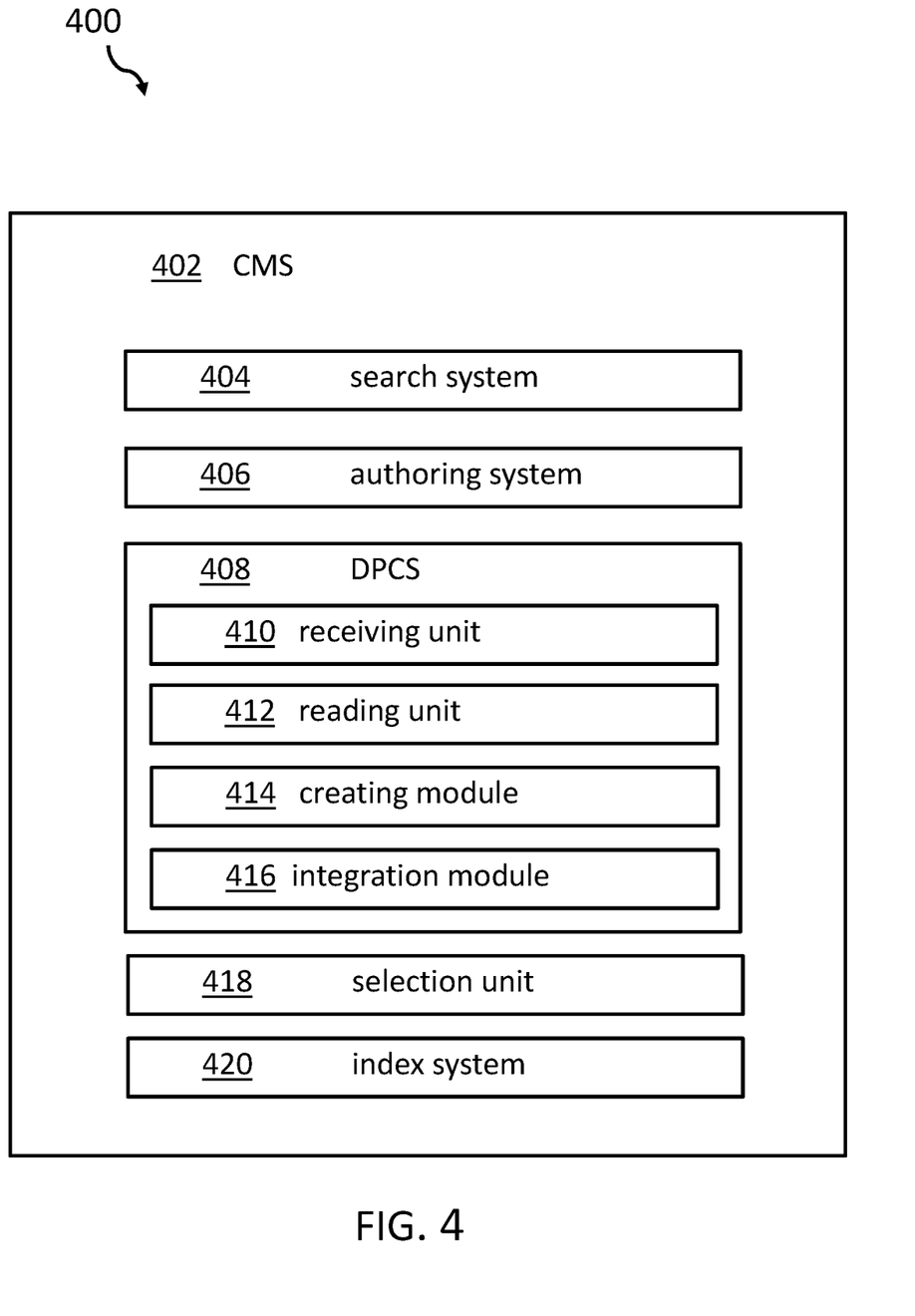
FIG. 4 shows a block diagram of an embodiment of the inventive system for importing external data into a content management system.

FIG. 4 shows content management system 400 for importing external data, the content management system 402 comprising a search system 404 and an authoring system 406. It also comprises a dynamic page connector system 408 adapted for an import of external data into the content management system 402. The dynamic page connector system 408 comprises a receiving unit 410 adapted for receiving an address for accessing the external data stored on an external data source, a reading unit 412 adapted for reading the external data using the address, a creation module 414 adapted for creating at least one new content item in the content management system 402 comprising at least a data element of the read external data based on the selected predefined page template, and an integration unit 416 adapted for integrating in the at least one new content item data concerning a hierarchy structure between the at least one created content item and other content items.

The content management system 402 also comprises also a selecting unit 418 adapted for selecting a page template from a plurality of predefined page templates stored in a template storage. Further units and/or modules may exist, e.g., an index system 420.

Figure 5:
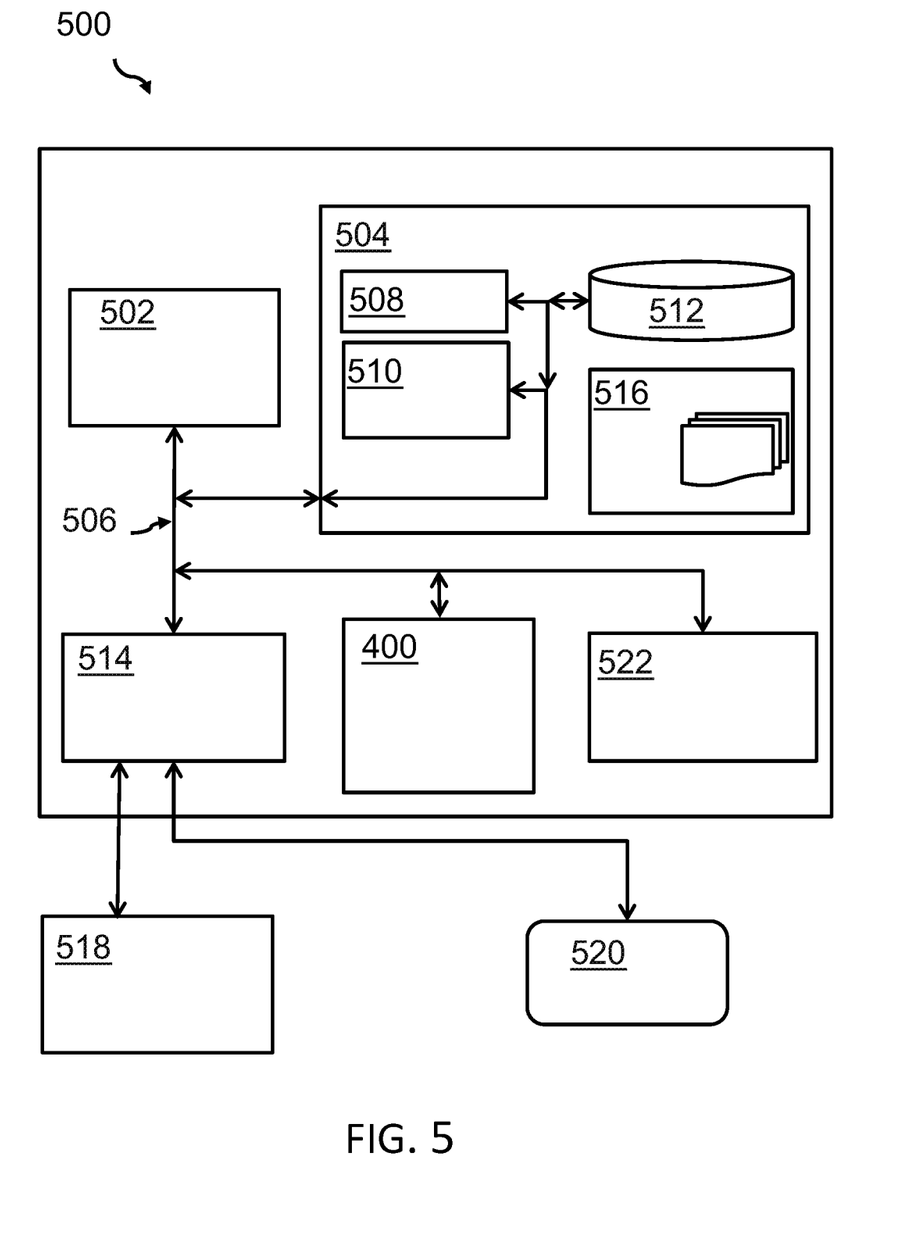
FIG. 5 shows an embodiment of a computing system comprising the system according to FIG. 4.

Embodiments of the invention may be implemented together with virtually any type of computer, regardless of the platform being suitable for storing and/or executing program code. FIG. 5 shows, as an example, a computing system 500 suitable for executing program code related to the proposed method.

The computing system 500 is only one example of a suitable computer system, and is not intended to suggest any limitation as to the scope of use or functionality of embodiments of the invention described herein, regardless, whether the computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 500 is shown in the form of a general-purpose computing device. The components of computer system/server 500 may include, but are not limited to, one or more processors or processing units 502, a system memory 504, and a bus 506 that couple various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random access memory (RAM) 508 and/or cache memory 510. Computer system/server 500 may further include other removable/non-removable, volatile/non-volatile computer system storage media. By way of example only, a storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, memory 504 may include at least one program product having a set (e.g., at least one) of program modules that are configured to carry out the functions of embodiments of the invention.

The program/utility, having a set (at least one) of program modules 516, may be stored in memory 504 by way of example, and not limiting, as well as an operating system, one or more application programs, other program modules, and program data. Each of the operating systems, one or more application programs, other program modules, and program data or some combination thereof, may include an implementation of a networking environment. Program modules 516 generally carry out the functions and/or methodologies of embodiments of the invention, as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of computer system/server 500 via bus 506. It should be understood that, although not shown, other hardware and/or software components could be used in conjunction with computer system/server 500. Examples, include, but are not limited to: microcode, device drivers, redundant processing units, external disk drive arrays, RAID systems, tape drives, and data archival storage systems, etc.

Additionally, the content management system for importing external data into the content management system may also be attached to the bus system 506.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method for importing external data from an external data source into a content management system, the method comprising:
   importing, by a computing device, the external data into the content management system using a dynamic page connector service, the content management system further comprising a search service and an authoring service;
   receiving, by the computing device, address data relating to the external data;
   reading, by the computing device, the external data using the address data received;
   automatically selecting, by the computing device, a page template from a plurality of predefined page templates, wherein automatically selecting the page template comprises extracting a keyword from a received data record associated with the external data and using the keyword to identify a structure of the received data record in selecting the page template;
   creating, by the computing device, at least one new content item in the content management system comprising at least a data element of the read external data based on the selected page template; and
   integrating, by the computing device, the at least one new content item into the content management system comprising other content items, wherein the other content items comprise already existing content items in the content management system, and wherein a hierarchy structure indicates a dependency between the at least one new content item and the other content items; and
   automatically synchronizing, by the computing device, the external data from the external data source with the content management system based on a messaging service using a messaging service notification, wherein synchronizing using the messaging service further comprises receiving on the content management system the messaging service notification indicating new content items from the external data source to initiate automatic reading and synchronization of the new content items.

2. A content management system for importing external data, said content management system comprising a search system and an authoring system, wherein said content management system also comprises a dynamic page connector system, wherein the dynamic page connector system imports the external data into said content management system, and wherein the content management system further comprises:
   one or more processors, memory, and program instructions stored on the memory and executable by the one or more processors for performing a method comprising:
   receiving an address for accessing the external data stored on an external data source;
   reading the external data using the address;
   automatically selecting a page template from a plurality of predefined page templates, wherein automatically selecting the page template comprises extracting a keyword from a received data record associated with the external data and using the keyword to identify a structure of the received data record in selecting the page template;
   creating at least one new content item in the content management system comprising at least a data element of the read external data based on the selected page template;
   integrating the at least one new content item into the content management system comprising other content items, wherein the other content items comprise already existing content items in the content management system, and wherein a hierarchy structure indicates a dependency between the at least one new content item and the other content items; and
   automatically synchronizing the external data from the external data source with the content management system based on a messaging service using a messaging service notification, wherein synchronizing using the messaging service further comprises receiving on the content management system the messaging service notification indicating new content items from the external data source to initiate automatic reading and synchronization of the new content items.

3. A computer program product for importing external data into a content management system, the computer program product comprising:
   a computer-readable storage medium having program instructions embodied therewith, wherein the computer readable storage medium is not a transitory signal per se, the program instructions executable by a computer to cause the computer to perform a method, comprising:
   importing, by a computing device, the external data into the content management system using a dynamic page connector service, the content management system further comprising a search service and an authoring service;
   receiving, by the computing device, address data relating to the external data;
   reading, by the computing device, the external data using the address data received;
   automatically selecting, by the computing device, a page template from a plurality of predefined page templates, wherein automatically selecting the page template comprises extracting a keyword from a received data record associated with the external data and using the keyword to identify a structure of the received data record in selecting the page template;
   creating, by the computing device, at least one new content item in the content management system comprising at least a data element of the read external data based on the selected page template; and
   integrating, by the computing device, the at least one new content item into the content management system comprising other content items, wherein the other content items comprise already existing content items in the content management system, and wherein a hierarchy structure indicates a dependency between the at least one new content item and the other content items; and
   automatically synchronizing, by the computing device, the external data from the external data source with the content management system based on a messaging service using a messaging service notification, wherein synchronizing using the messaging service further comprises receiving on the content management system the messaging service notification indicating new content items from the external data source to initiate automatic reading and synchronization of the new content items.

4. The method according to claim 1, wherein said receiving, said reading, said creating, and said integrating are performed by the dynamic page connector service.

5. The method according to claim 1, wherein the external data source for the external data comprise at least one of a shopping system, another content management system, a collection of content files in a file system, a collection of content files in a database, an electronic library system, a data corpus of an artificial intelligence system, a microservice, a cloud service, an enterprise application server, an enterprise application, a marketing system, a supply management system, a logistics system, or a tax system.

6. The method according to claim 1, wherein the search service is linked to a search index comprising internal and external content items and addresses of the internal and the external content items.

7. The method according to claim 1, wherein the creating of said at least one new content item further comprises:
copying, by the computing device, information from the at least one new content item into the page template;
overwriting, by the computing device, a data field in the page template using data read from the external data, the data field comprising at least one of a page title, a description, a search engine optimization universal resource locator data, a page content, keywords, tags, markup fragment, code fragment, a free content field, or an address of a further external service;
setting, by the computing device, parent page association data of the at least one new content item using the external data; and
adding, by the computing device, data required for reading a full data record from the further external service.

8. The method according to claim 1, further comprising:
comparing, by the computing device, the at least one new content item with the external data after a predefined time period enabling a resynchronization between the external data, the at least one new content item, and the other content items managed within the content management system.

9. The method according to claim 1, further comprising:
receiving, by the computing device, an invalidation event message by the content management system regarding the external data; and
deleting, by the computing device, the at least one new content item in the content management system, thus enabling a resynchronization between the external data, the at least one new content item, and the other content items managed within the content management system.

10. The content management system according to claim 2, wherein the external data source comprises at least one of a shopping system, another content management system, a collection of content files in a file system, a collection of content files in a database, an electronic library system, a data corpus of an artificial intelligence system, a microservice, a cloud service, an enterprise application server, an enterprise application, a marketing system, a supply management system, a logistics system, or a tax system.

11. The content management system according to claim 2, wherein the content management system is linked to a search index comprising internal and external content items and addresses of the internal and external content items.

12. The content management system according to claim 2, wherein the creating of the at least one new content item further comprises:
copying information of the at least one new content item into the template page;
overriding a data field in the page template using data read from the external data, the data field comprising at least one of a page title, a description, a search engine optimization universal resource locator data, a page content, keywords, tags, markup fragment, code fragment, a free content field, or an address of a further external service;
setting parent page association data of the at least one new content item using the external data; and
adding data required for reading a full data record from the further external service.

13. The content management system according to claim 2, further comprising:
comparing the at least one new content item with data of the external data after a predefined time period enabling a resynchronization between the external data, the at least one new content item, and the other content items managed within the content management system.

14. The content management system according to claim 2, further comprising:
receiving an invalidation event message by the content management system regarding the external data; and
deleting the at least one new content item in the content management system, thus enabling a resynchronization between the external data, the at least one new content item, and the other content items managed within the content management system.

* * * * *